United States Patent [19]
Klein et al.

[11] Patent Number: 5,076,650
[45] Date of Patent: Dec. 31, 1991

[54] CART FOR COLLECTION AND DISPOSAL OF LOW-LEVEL RADIOACTIVE WASTE

[75] Inventors: Robert C. Klein, Long Island City; Edward L. Gershey, New York, both of N.Y.

[73] Assignee: The Rockefeller University, New York, N.Y.

[21] Appl. No.: 560,148

[22] Filed: Jul. 31, 1990

[51] Int. Cl.$^5$ ............................................. A47B 91/00
[52] U.S. Cl. .................................................... 312/250
[58] Field of Search ...................... 312/250, 257.1, 320

[56] References Cited

U.S. PATENT DOCUMENTS

| | | | |
|---|---|---|---|
| 3,715,148 | 2/1973 | Beals | 312/250 X |
| 4,070,075 | 1/1978 | Morgan | 312/250 |
| 4,652,062 | 3/1987 | Greenwood | 312/250 X |

*Primary Examiner*—Joseph Falk
*Attorney, Agent, or Firm*—Wyatt, Gerber, Burke & Badie

[57] ABSTRACT

A cart for collection and safe disposal of low level radioactive wastes (LLRW) comprised of a compartment which is shielded to protect against exposure to radioactivity. The unique construction of the cart includes a sandwich construction of the compartment walls and ceiling wherein a thin layer of lead is sandwiched between coextensively bonded layers of methyl methacrylate polymer (Lucite).

8 Claims, 2 Drawing Sheets

CART FOR COLLECTION AND DISPOSAL OF LOW-LEVEL RADIOACTIVE WASTE

FIELD OF THE INVENTION

This invention relates generally to the collection, segregation, transportation and disposal of waste materials. In particular, this invention is directed to a cart having a novel construction specifically designed for collection and disposal of low-level radioactive wastes.

BACKGROUND OF THE INVENTION

It is estimated that each year thousands of scientists in various institutions use radiochemically labelled chemicals in their work for clinical and diagnostic purposes. Such institutions include biomedical research centers, universities, clinics, hospitals, medical schools, laboratories and physicians, offices. As a consequence of use of radiochemically labelled materials, these institutions generate waste, in both solid and liquid form, which is contaminated with low levels of radioactivity. These wastes are generally referred to as low-level radioactive wastes, abbreviated as LLRW. See article entitled, "Low-Level Radioactive Waste From U.S. Biomedical and Academic Institutions: Policies, Strategies and Solutions", A. WilKerson et al, Annu. Rev. Public Health, 1989, 10:299-377.

LLRW disposal has become extremely expensive due to complex regulatory requirements, both by the federal and state governments. These complex regulatory requirements reflect the publics' pressure based on their perception and apprehension of radioactive wastes in general resulting from mishaps in nuclear power plants and nuclear production facilities. Nevertheless, the complex governmental regulations have imposed stringent duties and liabilities on all generators of radioactive wastes, including LLRW generated in various institutions. Consequently, institutional generators of LLRW are finding it increasingly necessary to develop an efficient and economical means for disposing these wastes.

In an article entitled "Design and Evaluation of A Cart For the Collection and Segregation of Low-Level Radioactive Waste, by Robert C. Klein et al., Health Physics, Vl. 57, No. 6 (December 1989), pages 993-994, a metal cart was described for use in the collection of institutional LLRW. This was an all steel cart with Lucite and lead shielded walls. Since, this cart weighed over 200 pounds it proved too heavy to maneuver within the narrow hallways, elevators and corridors of various institutions such as universities, hospitals, clinics and research laboratories. In order to impart the requisite shielding property to these carts, the steel or metal was covered with Lucite sheets of approximately one inch in thickness or more which added to the weight of the cart. Accordingly, efforts were made to replace the all metal cart with a plastic cart in order to significantly reduce the weight of the cart and hence improve its maneuverability. Replacement of metal with polyethylene results in a significant decrease in cart weight, and polyethylene, like Lucite, affords adequate shielding against low energy $\beta$-particles but insufficient or inadequate shielding against high energy $\beta$-particles or against X-rays and $\gamma$-rays often emitted from LLRW.

Accordingly, it is an object of this invention to provide a cart for collection and disposal of LLRW which is relatively light in weight and hence readily maneuverable within confined spaces in institutional generators.

It is also an object of this invention to provide a light weight, highly maneuverable cart with adequate shielding property against both low energy $\beta$-particles and high energy $\beta$-particles as well as against X-rays and $\gamma$-rays.

It is yet another object of this invention to provide a light weight cart for collection and disposal of LLRW generated in various universities, clinics, biochemical research centers, hospitals, medical schools, physicians' offices, and like institutions.

The foregoing and other objects and features of the present invention will become more apparent from the ensuing detailed description and the corresponding drawings.

SUMMARY OF THE INVENTION

In accordance with this invention, a relatively light weight and maneuverable cart is provided for the collection and transportation of LLRW generated from institutional settings. The cart's unique construction guards against exposure to radioactive wastes by providing a waste collection compartment defined by a front wall, an opposed substantially parallel rear wall, a side wall, an opposed sliding door substantially parallel to said side wall, a floor and a ceiling, wherein each of said walls, said ceiling and said sliding door panel are made of a sandwich construction formed of an intermediate thin layer of lead coextensively secured on each side to a layer of methyl methacylate polymer (Lucite, a trademark of E.I. duPont de Nemour& Company). The thickness of the lead layer is no more than about 0.045 inch, preferably from about 0.015 inch to about 0.025 inch, and the thickness of the methyl methacrylate polymer is no more than about 0.50 inch, preferably from about 0.20 to about 0.25 inch. In order to further shield against exposure to radioactivity, the push side of the cart includes a panel formed of a sandwich construction wherein an intermediate layer of lead of no more than about 0.045 inch thick is coextensively to a layer of polyvinylchloride on the push side and a layer of polyethylene on the opposite side.

BRIEF DESCRIPTION OF THE INVENTION

In the drawings, wherein like reference numerals are employed to designate like parts:

FIG. 1 is a general perspective view of a cart constructed in accordance with this invention;
FIG. 2 is a side view of the cart, i.e., the right side;
FIG. 3 is a view of the front of the cart;
FIG. 4 is a view of the left side of the cart;
FIG. 5 is a view of the rear or push side of the cart, i.e., the side which is pushed by the operator;
FIG. 6 is a sectional view taken along the line 6—6 in FIG. 2 illustrating the novel sandwiched construction which provides the requisite shielding property against low level radioactivity, and
FIG. 7 is a sectional view taken along the line 7—7 in FIG. 5 showing a sandwiched construction of the rear panel of the cart.

DETAILED DESCRIPTION OF THE INVENTION

Figure 1:
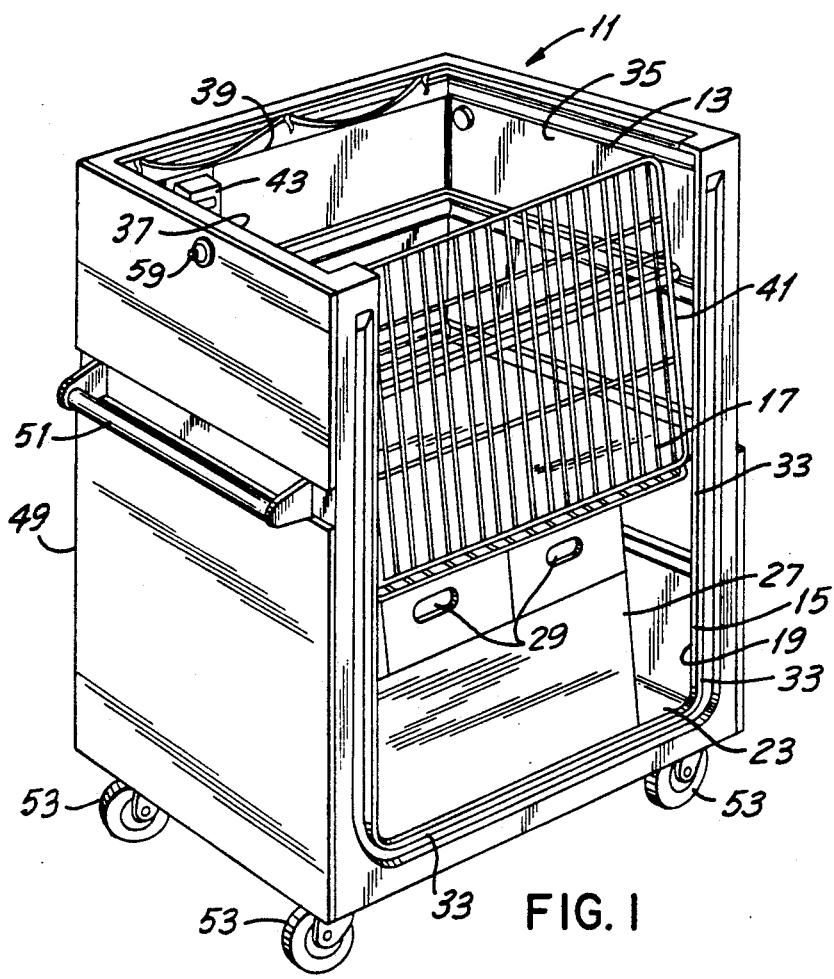

Referring first to FIG. 1, there is shown a cart generally designated as 11, constructed in accordance with the present invention. The cart 11 comprises an upper open faced caged compartment 13 and a lower waste collection compartment 15. The caged compartment 13 is separated from the lower compartment 15 by the top 17 which defines the ceiling of the compartment 15 as explained hereinafter. The lower compartment 15 is defined by a front wall 19, an opposed parallel rear wall 21 (see FIG. 2), the ceiling 17, the floor or bottom 23, a left wall 25 and an opposed sliding door panel 27. The construction of the compartment 15 forms a critical feature of this invention, particularly with reference to the materials of construction which form the walls and ceiling of this compartment.

The sliding door 27 contains two spaced apart hand grip ports 29 which are sufficiently large to insert the hand or several fingers of the cart operator in order to slide the door open to deposit the waste bottles or containers 31. The sliding door 27 is designed to slide within the sliding door channel 33. The sliding door channel 33 is sufficiently deep so that the compartment 15 can be partially opened by sliding the door 27 into the sliding door channel 33 in order to deposit the waste bottles 31.

Figure 2:
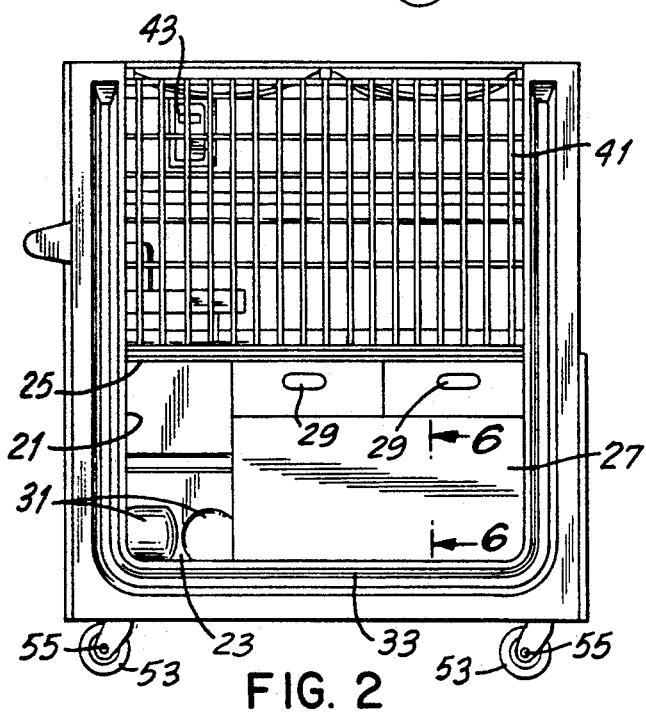
Figure 3:
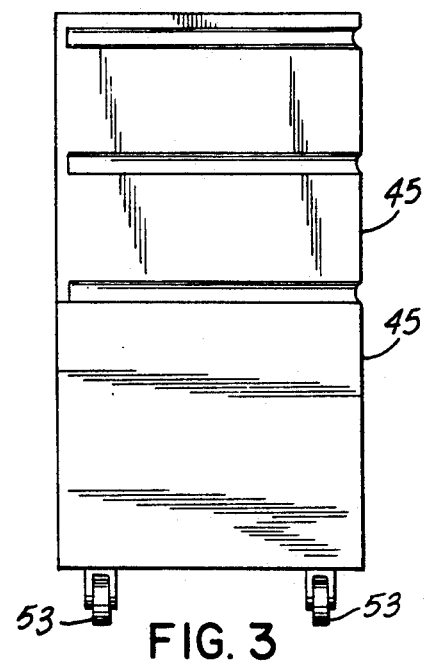
Figure 4:
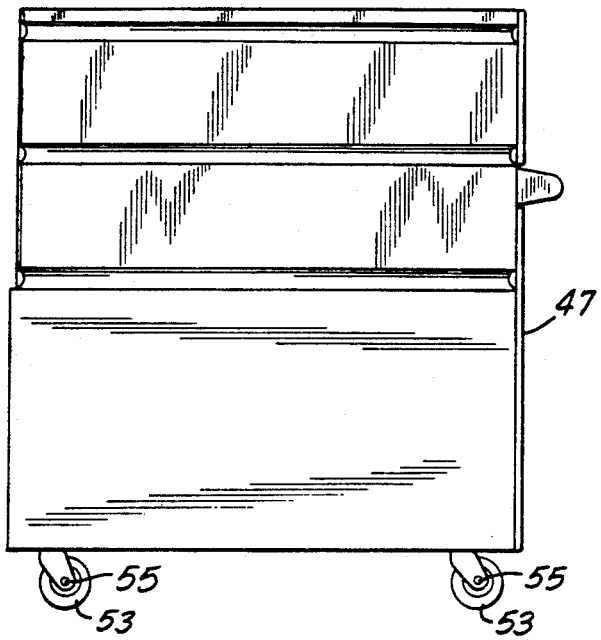
Figure 5:
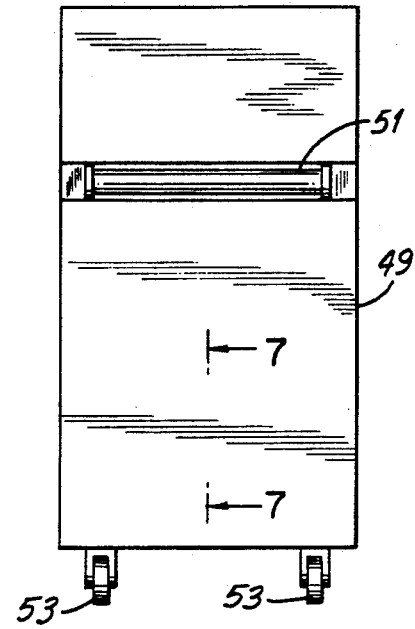
Figure 6:
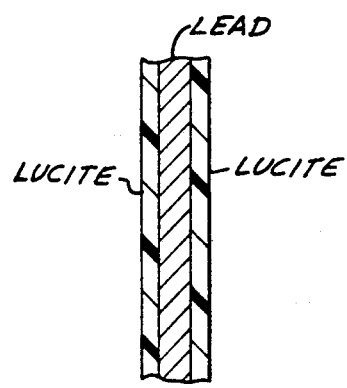
Figure 7:
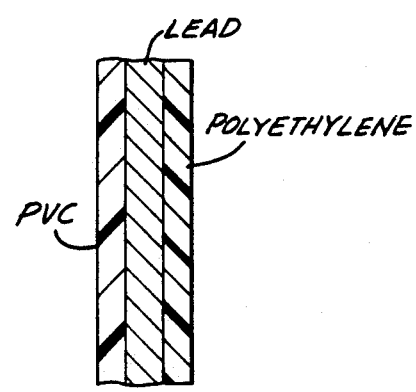

The upper or caged compartment 13 is defined by the front wall 35, rear wall 37, left wall 39 and the ceiling 17 of the lower compartment 15. A removable grill member 41 is removably mounted above the sliding door 27 and is readily removable for access to and deposition of wastes in the upper compartment. A portable beta-gamma radiation rate meter 43 (Autoranging Beta-Gamma Meter, Model 05-588, Victoreen-Nuclear Associates, Carle Place, N.Y.) is installed on the wall 39 as shown in FIGS. 1 and 2. The radiation rate meter 43 is employed initially to monitor and segregate the LLRW from other waste materials.

The cart 11 is also defined by a front panel which comprises a lower panel section 45A and an upper panel section 45B which are substantially coextensive with the heights of the lower compartment 15 and the upper compartment 13, respectively. The cart 11 further comprises a left panel 47 and a rear push side panel 49 which is provided with a push handle 51 for pushing and maneuvering the cart on its coasters 53. The coasters 53 are hinged such as by the swivel hinges 55 so that the cart can be readily maneuvered in any direction.

Conveniently, the cart is also provided with an electric buzzer 57 installed on the wall 39 for alerting pedestrians, and the upper housing 13 is provided with a hanging tray or shelf 59 for carrying various waste containers.

As it was previously mentioned, the materials of construction of the cart, particularly the sliding door panel 17 constitutes a critical feature of the present invention. Thus, the sliding door panel 27, the ceiling 17 and the walls 19, 21 and 25 are formed of a special sandwich construction wherein a thin lead sheet having a thickness of about 0.015 inch is sandwiched between two layers of Lucite, each layer having a thickness of about ⅛ inch. The ceiling 17 of the lower compartment 13 is formed similar to the sliding door with a lead sheet being sandwiched between two Lucite layers, of the same general thickness.

The lower front panel section 45A is formed of a thin layer of lead sandwiched between a layer of linear polyethylene and a layer of linear polyvinylchloride. The thickness of the lead layer is within the same range as the lead layer in the sliding door panel. The thickness of the polyvinylchloride layer is approximately ⅛ inch.

The lower rear and side panels are also made of a similar sandwich construction with a lead layer being sandwiched between a layer of polyethylene and a layer of polyvinylchloride of the same general thickness as the front panel.

The upper compartment 13 is made of polyethylene and is not shielded on all sides since the higher activity, higher hazard LLRW is collected in the lower compartment 15 for disposal. Thus, the inside of walls 35, 37 and 39 are bound only by polyethylene. However, the push side panel 49 is shielded against radioactivity with lead and an exterior sheet of polyvinylchloride to protect the waste handler from harmful exposure.

In use, the wastes are first collected and placed in the upper housing 13 where they are monitored with the rate meter 43 in order to segregate the wastes according to their surface exposure. Wastes producing more than 0.1 mSvh$^{-1}$ are classified as higher hazard LLRW and hence they are stored in the lower shielded compartment 15. All other materials which produce less than 0.1 mSvh$^{-1}$ are deposited on the tray 59 in the upper unshielded compartment.

The efficacy of the shielding construction of the lower compartment was determined in radiation exposure tests under actual working condition. Thus, a cart constructed in accordance with the invention containing up to 1.1 GBq of LLRW was monitored for radiation daily over a period of 5 weeks. The contents of the lower compartment and all cart surfaces were surveyed with an air equivalent ionization chamber, Model 36150, Keithly Instruments, Inc., Cleveland, Ohio, and their maximum values were recorded by site. The mean dose rate from all surfaces of the cart was 0.043 mSvh$^{-1}$. The open face of the upper compartment 13 produced the greatest average surface exposure while the mean does rate within the lower shielded compartment 13 was 3.07 mSvh$^{-1}$. This difference is indicative of the magnitude of reduction in surface exposure resulting from the novel sandwich construction of the walls of the lower compartment.

In forming the walls or panels of the cart, the intermediate layer may be co-extruded to the other two layers by conventional co-extrusion methods, or the layers may be bonded together by means of a suitable adhesive. The use of such coextrusion techniques or adhesives is within the knowledge of those skilled in the art.

Thus, the cart of the present invention offers a lightweight and efficient means and apparatus for the collection and safe transportation of institutional LLRW. The cart is relatively light in weight and easily maneuverable so that it is uniquely suited for use in such institutions.

What is claimed is:

1. A cart for collection and safe transportation of low level radioactive wastes which comprises an unshielded upper open face compartment and a shielded lower generally closed compartment including a ceiling which partitions said lower compartment from said upper compartment, said lower compartment being defined by a front wall, an opposed substantially parallel rear wall, a side wall, an opposed sliding door panel substantially parallel to said side wall, a floor and said ceiling, wherein said front wall, rear wall, side wall, ceiling and sliding door panel each has a sandwich construction formed of an intermediate thin layer of lead having a thickness of no more than about 0.015 inch, coextensively secured on each side to a layer of methyl methacrylate polymer having a thickness of no more than 0.25 inch.

2. A cart as in claim 1 wherein the thickness of said lead layer is about 0.015 inch and the thickness of each of said methyl methacrylate polymer layer is about 0.25 inch.

3. A cart as in claim 1 wherein said unshielded upper open faced compartment comprises a radiation rate meter for monitoring and segregating the low level radioactive waste from other waste materials.

4. A cart as in claim 2 wherein said unshielded upper open faced compartment comprises a radiation rate meter for monitoring and segregating the low level radioactive waste from other wastes materials.

5. A cart for collection and safe transportation of low level radioactive wastes which comprises an unshielded upper open face compartment and a shielded lower generally closed compartment including a ceiling which partitions said lower compartment from said upper compartment, said lower compartment being defined by a front wall, an opposed substantially parallel rear wall, a side wall, an opposed sliding door panel substantially parallel to said side wall, a floor and said ceiling; said cart further comprising a front panel, a side panel and a shielded rear push panel, wherein said front wall, rear wall, side wall, ceiling and sliding door panel each has a sandwich construction formed of an intermediate thin layer of lead having a thickness of no more than about 0.015 inch coextensively secured on each side to a layer of methyl methacrylate polymer having a thickness of no more than about 0.25 inch, and said shielded rear push panel is made of a sandwich construction formed of an intermediate thin layer of lead having a thickness of no more than about 0.015 inch, coextensively bonded on its push side to a layer of polyvinylchloride having a thickness of no more than about 0.38 inch and to a layer of polyethylene on its other side; said polyethylene layer being no more than about 0.25 inch in thickness.

6. A cart as in claim 5 wherein the thickness of the lead layer in the sandwich construction of said front wall, rear wall, side wall, ceiling and floor of said lower compartment is about 0.015 inch, the thickness of said methyl methacrylate polymer is about 0.25 inch, and wherein the thickness of the lead layer in the sandwich construction of said rear push panel is about 0.015 inch, the thickness of polyvinylchloride is about 0.38 inch and the thickness of polyethylene is about 0.25 inch.

7. A cart as in claim 5 wherein said unshielded open faced upper compartment comprises a radiation meter for monitoring and segregating the low level radioactive wastes from other wastes materials.

8. A cart as in claim 6 wherein said unshielded upper open faced compartment comprises a radiation meter for monitoring and segregating the low level radioactive wastes from other waste materials.

* * * * *